United States Patent
Hayes, Jr.

(10) Patent No.: US 6,993,763 B2
(45) Date of Patent: Jan. 31, 2006

(54) TECHNIQUE FOR SCHEDULING EXECUTION OF JOBS FOR OR BY NETWORK-CONNECTED DEVICES

(75) Inventor: Kent F. Hayes, Jr., Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 892 days.

(21) Appl. No.: 09/892,585

(22) Filed: Jun. 26, 2001

(65) Prior Publication Data

US 2002/0198923 A1 Dec. 26, 2002

(51) Int. Cl.
*G06F 13/00* (2006.01)

(52) U.S. Cl. .................... 718/102; 718/103; 718/105
(58) Field of Classification Search ......... 718/102–103, 718/105
See application file for complete search history.

(56) References Cited

U.S. PATENT DOCUMENTS

| | | | | |
|---|---|---|---|---|
| 4,337,513 A | | 6/1982 | Furuhashi | 364/431.11 |
| 4,497,978 A | | 2/1985 | Schoute et al. | 179/9 |
| 5,701,482 A | * | 12/1997 | Harrison et al. | 718/105 |
| 6,247,061 B1 | * | 6/2001 | Douceur et al. | 709/240 |

FOREIGN PATENT DOCUMENTS

EP       961204       1/1999

OTHER PUBLICATIONS

Shyh–In Hwang, et al. "Scheduling an Overloaded Real–Time System", (Conf. Proceed of the 1996 IEEE Fifteenth Annual International Phoenix Conference on Computers and Communications) p. 22–28, Published: New York, NY, USA, 1996.

* cited by examiner

*Primary Examiner*—Meng-Al T. An
*Assistant Examiner*—Qing-Yuan Wu
(74) *Attorney, Agent, or Firm*—Marcia L. Doubet

(57) ABSTRACT

Methods, systems, computer program products, and methods of doing business by improving the scheduling of execution of jobs for or by network-connected devices, thereby enabling the job execution process to scale more easily, efficiently, and effectively to support large numbers of devices and/or users. Examples of jobs include, but are not limited to, distribution of resources (including software, configuration information, images, and other types of content) to a device, fetching a device's inventory information, backing up a device's contents, and so forth. Jobs are programmatically scheduled based upon a specified time internal, according to a class of the requester. Only if an earliest start time after which the job may be executed for this requester has been reached will the job be executed, otherwise, the job execution is delayed. The disclosed techniques lessen the need for additional servers to handle spikes in processing load, reduce the likelihood of reaching system overload, and reduce the likelihood of cascading failures that may occur when systems are overloaded.

19 Claims, 6 Drawing Sheets

TECHNIQUE FOR SCHEDULING EXECUTION OF JOBS FOR OR BY NETWORK-CONNECTED DEVICES

BACKGROUND OF THE INVENTION

1. Field of the Invention

The present invention relates to a computer system, and deals more particularly with methods, systems, computer program products, and methods of doing business by providing an improved technique for scheduling execution of jobs for or by network-connected devices, thereby enabling the job execution process to scale more easily, efficiently, and effectively to support large numbers of devices and/or users. Examples of jobs include, but are not limited to, distribution of resources (including software, configuration information, images, and other types of content) to a device, fetching a device's inventory information, backing up a device's contents, and so forth.

2. Description of the Related Art

For those businesses which have large numbers of users with computing devices, managing the installed inventory of software and other resources (such as image files accessed by the software) on those devices can be a complex, tedious, expensive, and time-consuming task. It is necessary to track each software product installed on each computing device, including application software as well as system software (such as operating systems, printer drivers, and so forth). In addition, the version and/or release number of each software product must often be tracked, and it may be necessary to track the device's other resources as well. This inventory tracking enables the business to determine where to deploy new software or other resources when necessary, as well as which devices may need to have already-installed software or other resources deleted or updated. For example, if a security patch is to be distributed, it is necessary to determine which devices have the software being patched. (Furthermore, inventory tracking is often necessary to enable a business to determine whether it is in compliance with the licensing requirements of the various software vendors.)

Many businesses have an ever-increasing number of "mobile workers"—that is, workers who need to access the computing infrastructure of the business from off-premises. These workers may be using a myriad of different types of computing devices, and it is necessary to track the types of devices as well as the software installed on those devices. Often, the computing devices are designed to use wireless communication means; in other cases, such as when a worker telecommutes from home, wireline communications may be used. In this latter case, the worker's computing device may be of a type which is not typically considered mobile, such as a desktop computer. Some workers may alternate between using multiple types of devices. For example, an executive going on a business trip might use her desktop or laptop computer while in her office to book her airplane flight, then use her network-enabled cellular phone on the way to the airport to verify the flight departure time, and then use her personal digital assistant ("PDA") to view maps while driving to her hotel. Some experts have predicted that by the year 2003, an average user will have four different devices. As the number of devices in the business increases, it becomes increasingly beneficial to use an automated management system.

Individuals are beginning to use multiple types of computing devices in their personal lives as well. In addition to laptop or desktop computers, many people today use PDAs, pagers, and cell phones, as well as palmtop or handheld computing devices. A number of types of computing devices are gaining popularity with consumers, including wearable computing devices, in-vehicle devices, smartphones, set-top boxes, and smart appliances in the home, and other types of pervasive computing devices are likely to emerge in coming years. Some of these types of devices are not traditionally considered as performing computations per se. (For example, although in recent years PDAs commonly include networking functionality and application programs, early forms of PDAs served primarily as date/address books.) The term "computing devices" or "devices" is used herein to refer to any of these various devices to which software or other resources may be distributed, as well as more traditional computing devices such as desktop computers, servers, and mainframes. The term "resources" is used hereinafter to refer to software as well as images, configuration information, and other types of content that may be used by a device. In addition, resources may comprise information that is fetched from a device (such as an inventory of the device's installed hardware and/or software.)

Management services which enable businesses and individuals to manage the resources installed on their computing devices (and similarly, which allow retrieval of information about resources of computing devices, and performing other jobs for or by such devices) are commercially available. Organizations referred to as "service providers" provide this type of management service to networked customers. Service providers include Internet Service Providers ("ISPs"), Application Service Providers ("ASPs"), telephone companies, and others. Software products that perform this resource management function are also commercially available. An example is the Tivoli® Personalized Services Manager ("TPSM") product from Tivoli Systems. ("Tivoli" is a registered trademark of Tivoli Systems Inc.) TPSM includes a component known as Tivoli Services Manager ("TISM") and a component hereafter referred to as "Device Manager". Device Manager enables a service provider to manage thousands, or even millions, of devices effectively. Device Manager may also be used with a service provider's own subscriber software, rather than with TISM, and provides a number of features including: automatic provisioning and deployment; device configuration and software provisioning at first connection; and automated change management. Device Manager can also function without a subscription management system. (For more information on Device Manager, see the Device Manager Planning and Installation guide, which is available on CD-ROM from Tivoli Systems. For more information on TPSM. see "Introducing Tivoli Personalized Services Manager 1.1", IBM publication SG24-6031-00.

While products such as TPSM provide many advantageous features and assist greatly in the management of deployed devices, a particular resource distribution service may have a very large number of potential users and therefore many client devices. If a large number of devices request a resource distribution job at the same time, the server-side system may become overwhelmed with traffic and may be unable to service some portion of the requests in a timely manner—and some requests may even be rejected due to the system load. For example, if a new release of an operating system is scheduled for downloading to all handheld devices (perhaps requiring multiple client/application server interactions), and too many devices attempt to perform this download job at once, the download job may start to fail on some clients. The failures may trigger an automated retry process, which may further exacerbate the traffic overload. A snowball effect may result, in which there is so much load on the application server(s) that the job may never complete for many of the clients (or will not complete for a very long time). The automated deployment of resources to the devices may therefore function in a less-than-optimal manner. Simply adding more application servers is not likely to be a viable solution to this problem. This is because while requests for resource distribution may be made intermittently, spikes in demand may occur. For example, a group of users may often have very similar usage behaviors, wherein the workers of a business may connect to the network within a relatively small window of time to begin their work day and consumers may connect to their service provider in large numbers at certain times in the evenings or on weekends. Supposing that each connecting device requests delivery of resources, it is unlikely to be cost-effective for the service providers to install enough additional application servers to satisfy each request that might occur during such spikes in demand.

Accordingly, what is needed is a technique that avoids the limitations of prior art device management and/or resource distribution systems.

SUMMARY OF THE INVENTION

An object of the present invention is to provide a technique that avoids the limitations of prior art resource distribution systems.

A further object of the present invention is to provide a technique whereby the limitations of prior art device management systems are avoided.

Another object of the present invention is to provide an improved technique for programmatically scheduling the distribution of resources to network-connected devices.

Yet another object of the present invention is to provide this improved technique by programmatically scheduling the distribution of resources to a class of receivers over a predetermined time period.

Still another object of the present invention is to provide a technique whereby the execution of jobs for or by a device may be scheduled in an improved manner.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides methods, systems, and computer program products for scheduling distribution of resources to network-connected devices. In one aspect, this technique comprises: determining whether a requester of a resource distribution job should receive the resource distribution job by computing an earliest start time when the job is available to the requester; and distributing the requested resource distribution job to the requester if so. The technique preferably further comprises using class membership of a class of the requester in the determination, where this class membership may be defined based upon one of (1) a device type of a device of the requester; (2) software installed on the device; (3) one or more characteristics of users who may request the resource distribution job; (4) one or more characteristics of the device from which the job was requested; (5) one or more properties of a network connection over which the job was requested; or (6) one or more characteristics of an environment in which the job was requested. The distributed resources are preferably installed on the requester.

Computing the earliest time preferably further comprises using one of (1) an ordinal number associated with a device of the requester; (2) a current time of receiving the request for the resource distribution job; or (3) a random number.

In another aspect, the technique preferably comprises improving scheduling of jobs for network-connected devices by: determining whether a requester of a job should receive the job by computing an earliest time when the job is available to the requester; and distributing the job to the requester (or, alternatively, performing the job for the requester) if the earliest time has been reached. As one example, a job to be distributed may comprise fetching inventory information related to the requester's computing device from that device.

In yet another aspect, the technique preferably comprises improving resource distribution to network-connected devices by: determining whether a resource distribution job is available for a particular device; determining an interval over which the available job may be performed; and determining an earliest time in the interval when the job may be executed for the particular device. The technique may further comprise requesting that the available job be performed for or by the particular device if the earliest time has been reached.

The present invention may also be used advantageously in methods of doing business, for example by providing improved resource distribution systems wherein a service provider may offer its customers a higher likelihood of successful resource distribution to network-connected devices and/or better overall performance of resource distribution operations.

The present invention will now be described with reference to the following drawings, in which like reference numbers denote the same element throughout.

DESCRIPTION OF PREFERRED EMBODIMENTS

Figure 1A:
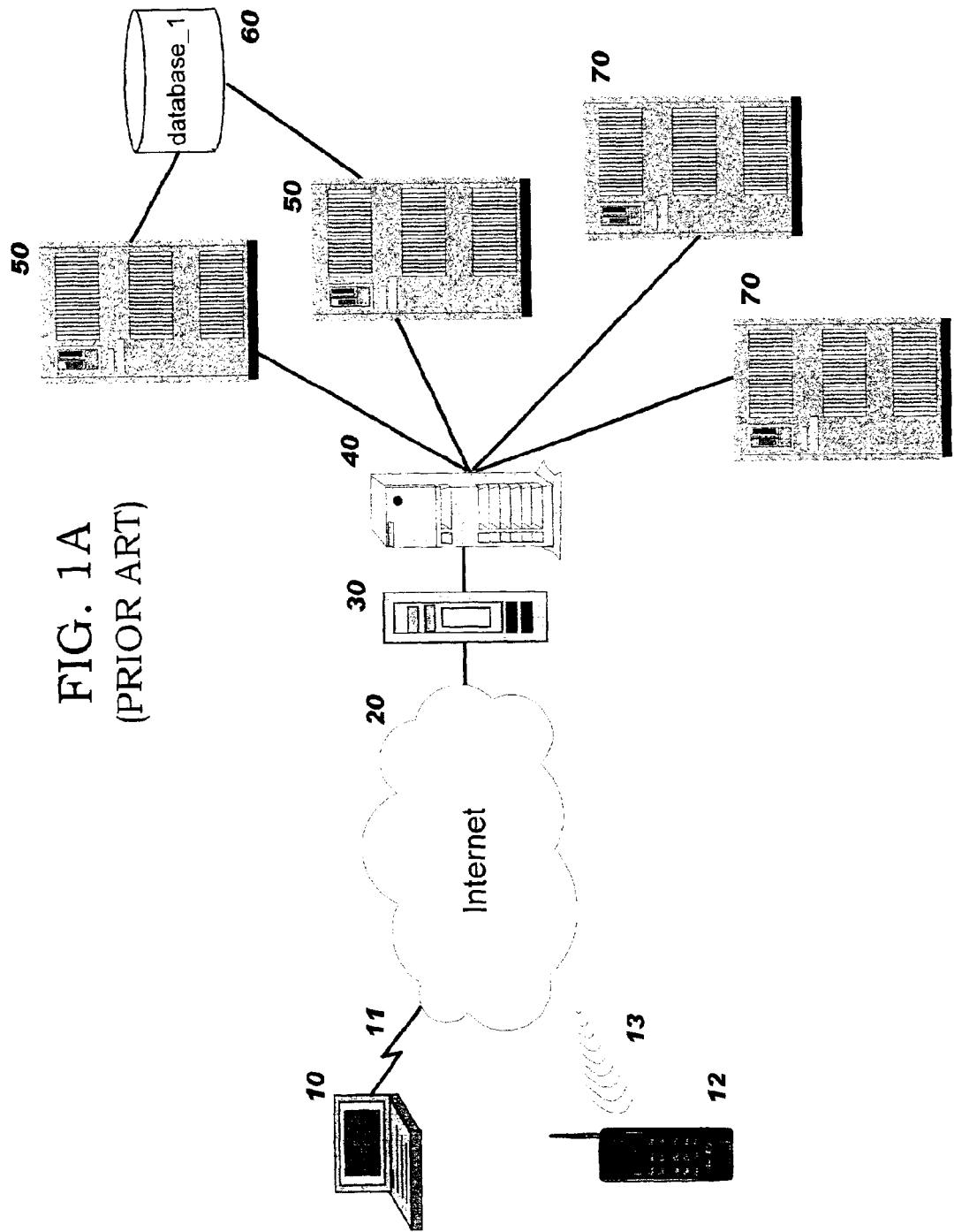
FIGS. 1A and 1B are diagrams of networked computing environments in which the present invention may be practiced.

The present invention provides improved techniques for programmatically scheduling execution of jobs such as the distribution of resources to network-connected devices, where those resources include application software, systems software (including patches as well as complete operational programs), and other types of content such as the images, sound files, configuration information (such as a telephone number to use when making subsequent dial-in connections), and/or rest pages that may be used by the software executing on a device. Note that while preferred embodiments are described herein primarily with reference to scheduling resource distribution jobs, this is for purposes of illustration and not of limitation: the disclosed techniques may be used advantageously with other types of jobs as well. For example, the disclosed techniques may be used for jobs which fetch information from a device (such as an inventory of its installed hardware or physical characteristics and/or its installed software), or with jobs which cause a device to back up its contents, and so forth.

The disclosed techniques avoid limitations of prior art techniques, which may suffer from degraded performance or failure during times of heavy load. The techniques disclosed herein programmatically distribute the resource distribution operation for a class of receivers over a time period. The members of the class may be determined in an implementation-specific manner which does not form part of the present invention. Classes might be defined to represent characteristics of devices. As one example, a class might comprise all devices of a particular type, such as all handheld devices or perhaps all devices that have severe constraints on memory or storage. The techniques of the present invention may then be used to download a particular resource to each such device in an improved manner. As another example, a class might comprise those devices executing a particular operating system, for example when the resource to be distributed is a revised version of that operating system. Or, a class might comprise devices assigned to workers who are members of a certain department. As an example of this latter scenario, a business might determine that all of its executives should receive a new application program for downloading and installation on their PDAs, and the class might therefore identify a department to which these executives belong. Many other types of class composition may be envisioned.

Optionally, an implementation of the present invention may support subclasses. As an example, a class might comprise all handheld devices using the Palm™ operating system, and different subclasses represent different versions of the operating system. ("Palm" is a trademark of Palm, Inc.) Hereinafter, references to classes are intended to refer to subclasses as well.

The task of identifying a resource (or equivalently, a group of resources) to be downloaded to a class is preferably performed by a person who will be referred to hereinafter as a systems administrator. Techniques for this type of identification process are known in the art. Device Manager, for example, enables an administrator to define classes to which resources should be distributed, where the class membership is comprised of devices of a similar type (such as handheld devices, for example), and also enables the administrator to define one or more resources to be downloaded to each device in a class.

In preferred embodiments, the administrator also defines a start time and an end time when each resource distribution job is available to run (i.e. to be distributed to, or requested by, client devices). The block of time between the job start time and the job end time is referred to herein as the "execution window" for the job. For those jobs which are to be load-balanced according to the present invention, the administrator also defines a particular time interval over which the load balancing may occur. The techniques disclosed herein use the execution window and the time interval to calculate the earliest time a job may run for each requesting client, and reduce the likelihood that large numbers of clients will attempt to run a job simultaneously. By spreading (i.e. load balancing) the resource distribution job over time, as will be described in detail below, it is less likely that the service provider's application servers and/or device management servers will be overloaded with processing requests, and less likely that performance of other network elements (such as Web servers, load balancing hosts, database engines, and so forth) will be degraded by the resource distribution jobs. In turn, the distribution to a particular device is less likely to fail or to result in inefficient retry attempts, and is more likely to complete in a timely manner and thus avoid user frustration. The service provider may therefore scale its services to larger numbers of users and/or devices without requiring installation of additional application servers.

According to the present invention, a number of equivalent approaches may be used for defining the time interval over which resource distribution jobs should be spread. In one approach, the administrator may specify a time interval as a parameter for each resource distribution job. When using Device Manager, for example, an additional parameter such as "LoadBalanced", which takes values of TRUE or FALSE, may be provided when defining a job; when set to TRUE, an additional parameter specifies the load balancing time interval. The length of the interval is preferably determined by the systems administrator using his or her knowledge of the job and the environment in which it will run. For example, a relatively long period of time might be scheduled for larger jobs (such as deployment of new operating systems), and a shorter period of time might be scheduled for jobs that are smaller and will not consume as many system resources. Or, a more important job might be scheduled over a shorter time period to accelerate its deployment, while a less important job might be allowed to phase in more slowly by having a longer time period. In another approach, the administrator may specify a time interval that is based upon the characteristics of the class members, rather than the resources to be distributed to those class members. For example, a characteristic of interest might be the number of members in the class, and the time interval might be relatively shorter for classes having fewer members than for those classes having many members. Or, the time interval might be selected based upon the behavior characteristics of users in the class. Suppose, for example, that the service provider serves students, professors, and administrative personnel of a university. It might be determined that the students are more likely to access the network seven days per week, whereas the administrative personnel only use the network during the work week. In that case, separate classes might be defined for the different types of users, and the time interval might be designed to account for the number of days when class members are more likely to be using their devices.

Alternative approaches for determining the time interval include use of device-specific intervals, default intervals which may be optionally overridden, system-wide fixed intervals, fixed intervals per class, and programmatic determination of interval length. As an example of the latter, an expected duration might be provided for a resource distribution job such as an operating system upgrade, and the time interval length might be computed based upon this expected duration.

In preferred embodiments, the time interval may be specified in units of hours and/or days. (Note, however, that other time units may be used without deviating from the scope of the present invention.) For example, an interval might be specified as "30 days", or perhaps as "18 hours". A job's execution window might be, for example, "starting at 16:00 on Jul. 1, 2001 and ending on Jul. 1, 2002". Note that the size of the job's execution window and the load balancing interval are, in most cases, not the same. The load balancing interval is typically shorter than the job's execution window.

Note that the environment for managing pervasive devices (that is, devices which may be disconnected from the network much or perhaps even most of the time, such as Web-enabled cellular phones, and which may connect at unpredictable times) and for distributing resources to such devices is more complex than the environment for providing similar support to devices which are often connected. To manage pervasive devices, a management system such as TPSM must be able to handle the infrequent and unpredictable connections: management actions, including resource distribution, can only be taken when a device has some sort of connectivity to the management system. If all devices were "always" connected, or if the management system could initiate contact with a device to begin some management action, then distributing the load of management tasks such as resource distribution would be greatly simplified because the management system could typically control the time at which the management action would begin for each particular device. However, with devices that are often disconnected, the initiation of management actions by the management system is not a suitable approach: instead, the management system must take action only when the client device has network connectivity to the management system. Therefore, an execution window in which a job is available for executing by or for those devices which connect to the management system is a preferred approach for scheduling work.

For purposes of illustrating operation of the present invention, it will be assumed for an example scenario that a systems administrator specifies that a resource distribution job "ABC" has an execution window which begins on Jul. 1, 2001 and ends on Jul. 1, 2002, and that this job ABC comprises downloading resources to all members of a class "XYZ". In addition, it will be assumed that this job has a load-balancing time interval of 30 days.

Figure 1B:
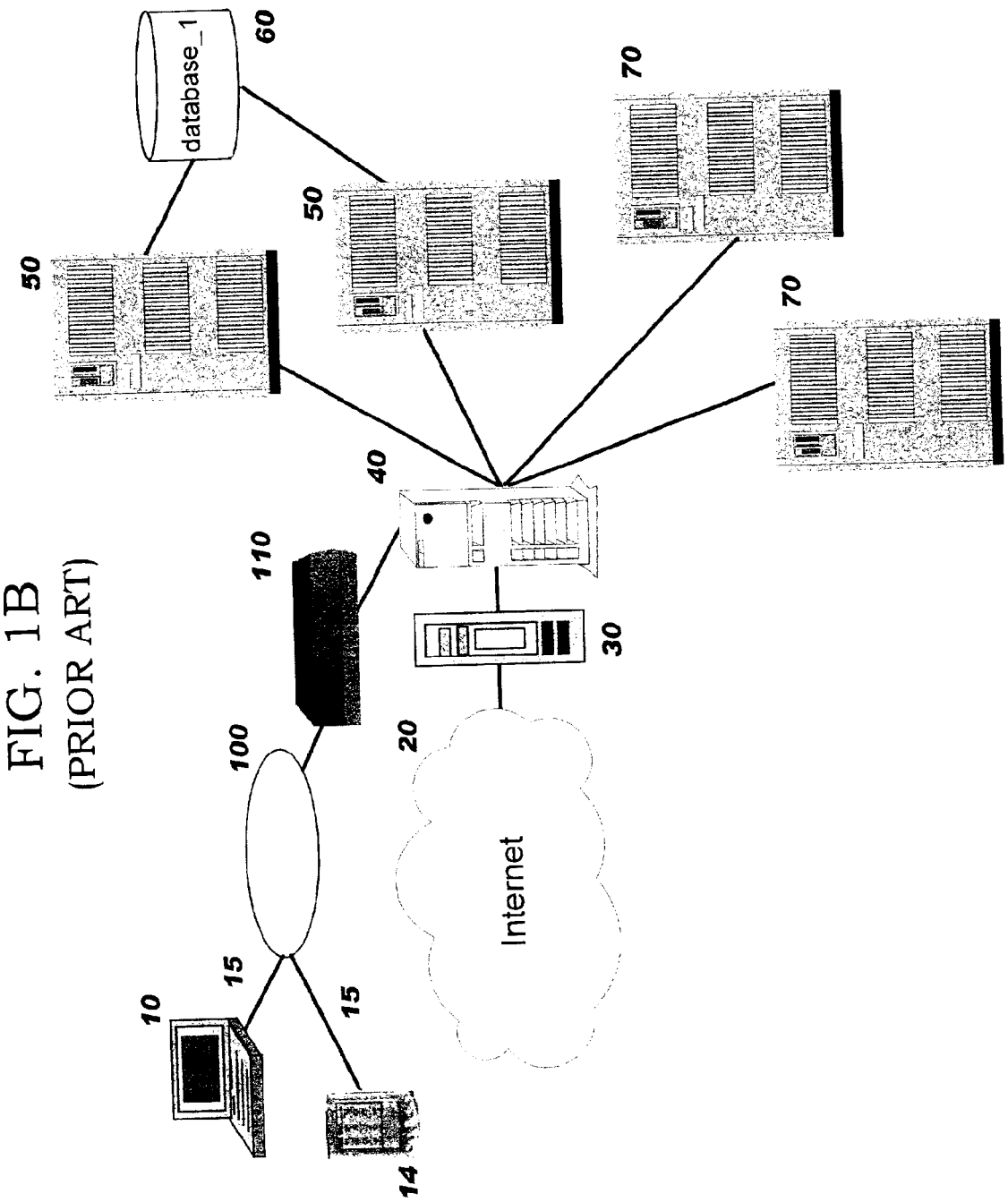

FIG. 1A illustrates a networked computing environment in which the present invention may be practiced. Exemplary devices 10 and 12 are shown, which in this example represent a laptop computer 10 and a network-enabled cell phone 12. Devices 10 and 12 communicate over network connections 11 and 13, respectively, through a network which (for purposes of illustration) is depicted as the public Internet 20. The connections may use a networking protocol such as the Transmission Control Protocol/Internet Protocol ("TCP/IP") or User Datagram Protocol ("UDP") over IP, X.25, Frame Relay, Integrated Services Digital Network ("ISDN"), Public Switched Telephone Network ("PSTN"), and may be carried over a number of alternative connection media, such as cellular phone networks, radio frequency networks, satellite networks, etc. FIG. 1B illustrates an environment where devices such as laptop computer 10 and handheld computer 14, to which resources may be distributed according to the present invention, may also be connected using dial-up connections over wireline connection media 15 such as cables and telephone lines, and/or may be connected via a private network instead of the public Internet. In this example, the devices 10, 14 are illustrated as connecting to a telephone network 100, which in turn connects to a router 110 or similar network access server to reach the back-end network (which is depicted generally as comprising devices 50, 60, and 70) through a server 40 (which in preferred embodiments is a network dispatcher or load balancing host).

Typically, a firewall 30 is located between the public network 20 and the back-end network. Network dispatcher 40 may serve to route incoming client requests to a plurality of servers 50 on which a device management system such as TPSM operates. As is known in the art, multiple servers 50 may be provided for redundancy (to handle increased load, failover, and so forth). These servers 50 may access a database 60 or similar data repository which stores, inter alia, information about the devices being managed. One or more application servers 70 may also be connected to network dispatcher 40. The resources to be distributed may be stored on one or more data repositories (not shown) which are accessible to servers 50 and/or to servers 70.

FIG. 1A is representative of a device management hosting environment wherein a service provider offers device management services for its customers, but may obtain that device management service from a third party vendor (which may provide device management for other service providers as well). FIG. 1B is representative of an environment in which a service provider does it own device management hosting.

In some preferred embodiments, which will be described with reference to FIG. 2, code embodying the present invention preferably operates entirely on servers 50, which may optionally be dedicated to carrying out the device management function. The device management function of servers 50 may alternatively be co-located with the function of servers 70. In this case, code embodying the present invention may be operating on one or more of the application servers 50 or at other appropriate location(s) on the server side of the network. In other preferred embodiments, which will be described with reference to FIG. 3, code embodying the present invention operates partially on the client side of the network on the individual client devices 10, 12, 14. (Note that in this latter case, due to the backward-compatible manner in which the present invention is designed, it is not necessary that every client device embody code which supports the present invention. This will be described in more detail with reference to FIG. 3.)

In a device management environment supporting automated resource distribution, client devices such as those depicted at 10, 12, and 14 in FIGS. 1A and 1B contain software which will be referred to herein as an "agent" that is adapted to communicating with the device management system to determine whether a resource distribution job is available. The user may be required to explicitly activate this agent, the agent might be activated automatically when the client device connects to the device management system, or the agent might be configured to automatically connect the device to the device management system. This type of agent software is known in the art. The manner in which the present invention improves the distribution of the jobs in this environment will now be described with reference to FIGS. 2 and 3.

Figure 2:
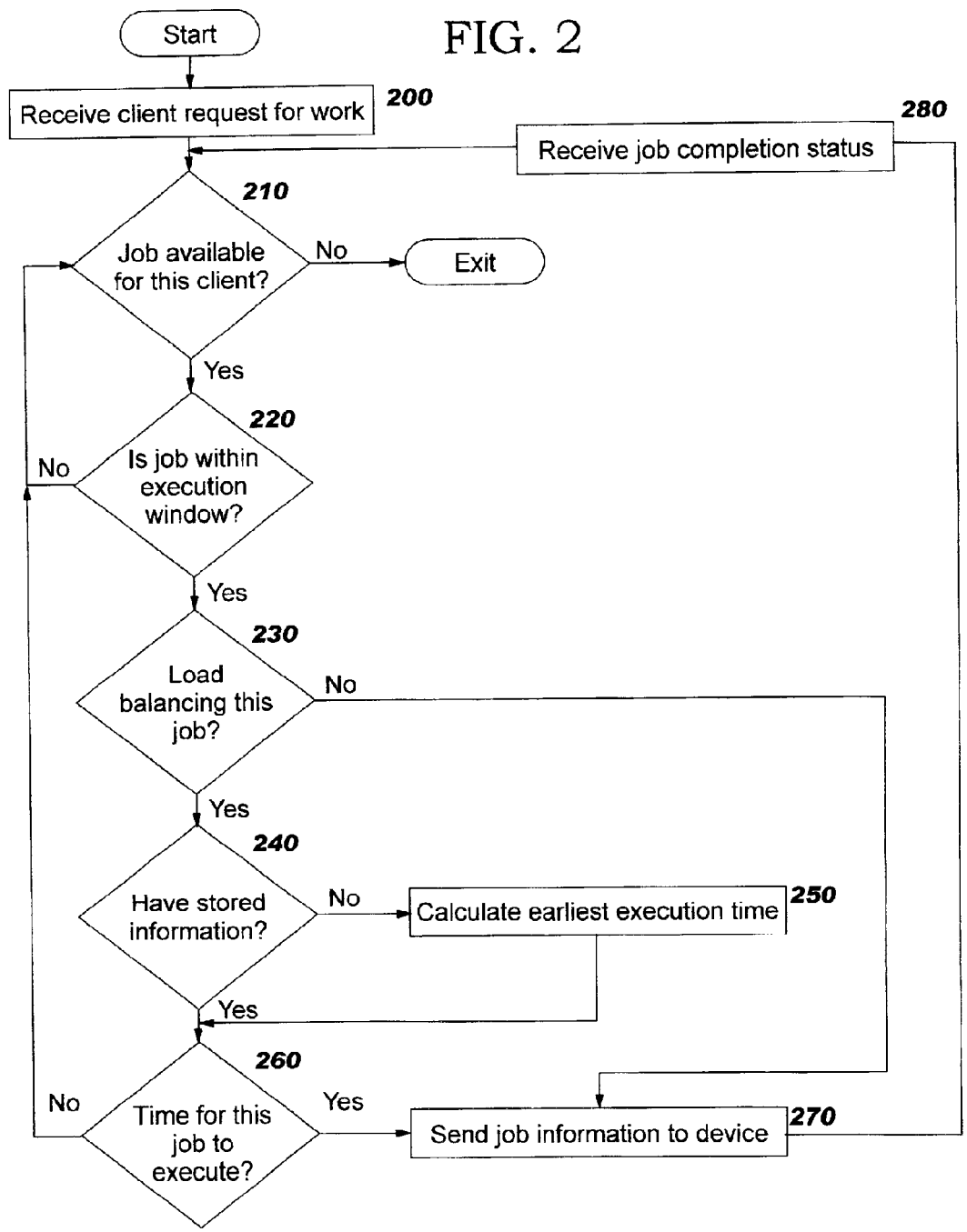
FIG. 2 provides a flowchart which illustrates logic that may be used to implement preferred server-side embodiments of the present invention.

In the server-side embodiment depicted in FIG. 2, the process begins at Block 200 where the server-side device on which the present invention is embodied receives a request for work from a client device. Typically, a client device polls the server to determine whether work is available, and information about each available job is conveyed to the client. Thus, the logic in FIG. 2 is preferably invoked each time the polling process occurs. (A device may poll the server each time it establishes a connection, or perhaps at periodic intervals. The manner in which the polling is initiated does not form part of the present invention.)

In response to receiving the client request, the server checks at Block 210 to determine whether any work is available for this requester. The request may explicitly identify the class to which this device belongs. Or, the class may alternatively be deduced using information from the request. (For example, information about the device type and its user agent is typically available from fields of the request header when using the Hypertext Transfer Protocol, or "HTTP".) Combinations of explicit and deduced information may also be used to determine class membership.

If the test in Block 210 has a negative result, then there is no work for this client, and control exits from the processing of FIG. 2. A return code indicating that no work is available may be returned to the requesting client, if desired. For purposes of illustrating the present invention, it will be assumed that any job available for the client is a resource distribution job.

When the test in Block 210 has a positive result, then Block 220 checks to see if this resource distribution job is within the execution window in which the job can be run. If not, then the information about the job will not be sent to the client, and control returns to Block 210 to see if any other jobs are available for this client. If the job is within its execution window, however, then Block 230 checks to see if the job is being load balanced according to the present invention—that is, whether the resource distribution operation is being spread over a time interval as disclosed herein. Preferably, a parameter is associated with resource distribution jobs that specifies which of those jobs are being load balanced, as stated earlier. A default value of "FALSE" is preferably provided to ensure backward compatibility, wherein those jobs which have not been identified as subject to load balancing use this default value.

When load balancing for the resource distribution job is not being performed, then the job may be run immediately. Therefore, control transfers from Block 230 to Block 270 and information about the job is returned to the requester as in the prior art. (This information may comprise, for example, a job identifier, or perhaps an address where the client should connect to request the resources to be distributed, as well as other information such as parameter values that may be required to carry out the distribution operation.) (Note that a subsequent connection from the client to a server such as application server 50 or device management server 70 in FIGS. 1A and 1B may be established for loading the software and/or other resources associated with the job, bypassing the load balancing host or dispatcher, as will be obvious to those of skill in the art. In some cases, the client may connect directly to the server on which the resource to be downloaded resides, or is otherwise accessible. In other cases, the client may contact a device management server 50, which may then contact another server such as application server 70 on the client's behalf. In this latter case, a device management server 70 may serve as an intermediary between the requesting client and the server from which the resources are available, or the device management server and the resources may be co-resident on the same machine.) After this job has been handled in Block 270, and the job completion status has preferably been reported to the server (Block 280), control preferably returns to Block 210 to determine whether any other jobs are available for this requester.

When the available job is within its execution window but it is subject to load balancing, control reaches Block 240 which checks to see if information about the earliest time the job can run on this client is known. By determining the earliest time the job can run on a particular device, the processing load is more likely to be spread over time, even though many clients may request the job in close proximity. A time interval beginning at this device-specific "earliest time" and extending to the job's end time (as discussed above) thus effectively defines a "device-specific execution window" for a job. (In addition, one or more subclass-specific execution windows may be defined and used to schedule jobs, using the techniques disclosed herein.) If the earliest time for this device is not known upon reaching Block 240, then control transfers to Block 250 where it is calculated and stored. Several alternative algorithms may be used for this calculation, depending on the preferences of a particular implementation of the present invention. In preferred embodiments, the following algorithm is used to determine the earliest time when the job can run for this device:

earliest time for this device=current time+[(device number) modulo (load balancing time interval length)]

In alternative embodiments, an algorithm such as earliest time for this device=current time+[(current time in microseconds) modulo (load balancing time interval length)]

may be substituted without deviating from the inventive concepts of the present invention. Because this value specifies the earliest time that a device is permitted to perform the job, the calculation is not necessarily required to produce distinct values for each requester. Instead, the calculated value is used to limit the likelihood of jobs starting simultaneously.

The current time at which the server is performing the algorithm calculation is used within the algorithm, according to preferred embodiments, in order to further decrease the likelihood of many devices attempting to run the job simultaneously. This may be illustrated with reference to the example scenario. Suppose that the calculation for each device in Class XYZ was performed instead with reference to the beginning of the job's execution window. The earliest execution time for each device might then be spread evenly over that 30-day period. However, if none of the devices in the class connects until the very end of the 30-day period, then all of them (or nearly all of them) would have reached their "earliest execution time", and each would be permitted to request job ABC, with the result that the spike in demand has not been alleviated after all. Therefore, preferred embodiments of the present invention perform the calculation of earliest execution time for each device when that device's work is being evaluated, and use the current time in this calculation.

While device number and the current time in microseconds are shown in the example algorithms, other values may be used alternatively to spread the "earliest time" values for the devices in the requester's class over the load-balancing time interval. For example, it may be possible to use a device's Internet Protocol address or its media access control ("MAC") address for this purpose. Reference to device number in the algorithm, as used herein, means an ordinal which serves to enumerate the members within a class, and is not to be construed as limiting the calculation to use of a device serial number. For example, a device management system typically has stored information about the devices within a class, and an ordinal number such as relative position of this device's information within a table where the class information is stored may be used as this ordinal value. Use of the current time in microseconds is an alternative technique that serves to spread the calculated values in a somewhat random manner over the time interval. (Random numbers may be generated for this purpose as well, and used in the algorithms above in place of the device number ordinal or current time in microseconds.)

Once the device's earliest execution time for this job has been calculated, it is preferably stored at the server. If the requested job is to be delayed, as discussed below with reference to Block 260, then upon a subsequent invocation of the logic of FIG. 2 for this job for this client (or for this subclass, as appropriate), the stored information can therefore be used to bypass execution of Block 250.

Upon reaching Block 260, a test is made to determine whether it is time for this job to execute on this client—that is, whether the current time is later than the earliest start time for this client to start this job but still earlier than the expiration of the execution window for this job. (Alternatively, the test may comprise simply determining whether the current time is later than the earliest start time, depending on the needs of a particular implementation of the present invention.)

According to the present invention, if this client has work available but is not yet time for this job to execute on this client, then information about the job is not returned to the client.

Thus, when the test in Block 260 has a negative result, control returns to Block 210 to see if any other jobs are available for this client. This client is thereby prevented from performing the resource distribution job and thereby adding to the system workload, with the result that those clients which are currently receiving resources and performing work are likely to experience better performance. With reference to the example job ABC, if a requester in class XYZ requests work at 1 a.m. on Aug. 2, 2001, but the server determines that the device's earliest execution time for this job begins at 10 a.m., then the "No" path is taken from Block 260 (even though the client has connected within the job's execution window). If the test in Block 260 has a positive result, on the other hand, then it is effectively this client's "turn" to receive the job information (i.e. to perform the work), and the information about this available job is returned to the client for processing (Block 270). As an example of this processing, a software upgrade job might entail transmitting to the requesting client an executable installation file that may be started automatically after arrival on the client device, thus keeping the client device's software up-to-date. Preferably, after the client performs the job, a job completion status is reported to the server. As indicated in Block 280, after the server receives this status information, control returns to Block 210 to see if any more jobs are available for this client.

Figure 3:
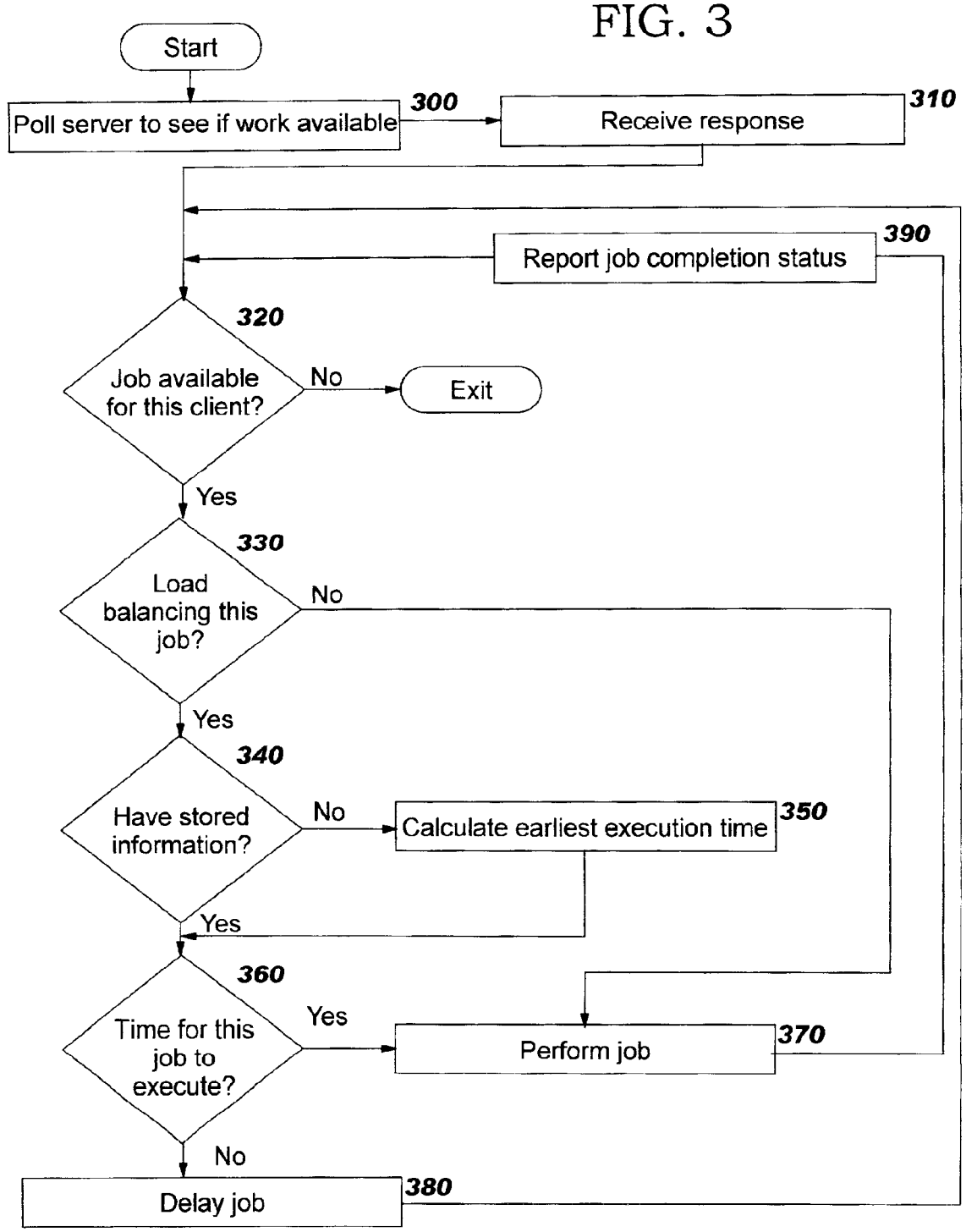
FIG. 3 provides a flowchart which illustrates logic that may be used to implement preferred client-side embodiments of the present invention.

FIG. 3 depicts a technique which is similar to that of FIG. 2, but executes on client devices. This process begins at Block 300 where the client polls the server (as described earlier with reference to the invocation of the logic in FIG. 2) to determine if work is available for this device. As discussed with reference to Block 200 of FIG. 2, the client might automatically check for work upon connecting to the device management system, or explicit action of the user might be required alternatively. At Block 310, the server's response is received. Preferably, this response comprises a Yes/No indication of whether work is available, and information concerning the job to be performed. A Uniform Resource Locator ("URL") or other information addressing any resources to be loaded may be associated with, or provided with, the job information. Block 320 then checks the server's response. If the server's response was negative (i.e. there was no work for this class), then control exits from the processing of FIG. 3. The client device may continue to periodically poll the server (by returning to Block 300) until it disconnects.

When the server's response was positive, then Block 330 checks to see if this resource distribution job is being load balanced according to the present invention. Preferably, this test comprises checking whether the server's response includes a load-balancing parameter, and if so, determining the value of that parameter. Absence of a load-balancing parameter may be taken as a negative result to this test. This solution is backward-compatible in that the server may return a consistent response format to all requesting devices (and the server might not, in fact, understand the meaning of the load-balancing information it passes), whether or not those devices embody code that supports the present invention; those client devices implementing the processing of FIG. 3 evaluate and respond to the parameters which are supplied for load balancing, and those devices which do not simply ignore them. (Note that it is not necessary for the client to check whether the job is within the job's execution window: if it was not, the job information would not have been returned to the client by the server.)

When load balancing for a resource distribution job is not being performed, control transfers from Block 330 to Block 370, and the job is performed as in the prior art, after which the job completion status is typically reported to the server (Block 390) and control returns to Block 320 to see if more jobs are available for the client. Performing the job typically comprises establishing a subsequent connection(s) from the client to the application server (either directly, or indirectly through the device management server, as described earlier), using the URL or other addressing information which was received in Block 310. Otherwise, when the available job is subject to load balancing (i.e. when the test in Block 330 has a positive result), Block 340 checks to see if stored information is available about when the job can be executed on this client. If not, then control transfers to Block 350 where it is calculated. Preferably, this calculation comprises using the alternative algorithm discussed above (i.e. using the current time in milliseconds) to determine this client's client-specific earliest starting time for this job, unless the server notifies the client device of its ordinal device number or an ordinal device number exists or can be calculated on the client. (For example, an ordinal number may perhaps be calculated from the device's serial number or MAC address, or may have been stored on the device at an earlier time.) Note that the information about the earliest start time for the job is being calculated by the client in the scenario of FIG. 3, whereas it was calculated by the server in the scenario of FIG. 2. After the earliest start time is calculated, it is preferably stored in memory or storage which is accessible to the client device, from which it may be used for subsequent iterations through the logic of FIG. 3. (Typically, the value will be stored on the client device, although alternatively it might be stored elsewhere.)

Upon reaching Block 360, a test is made to determine whether the current time is later than the earliest start time for this client to start this job. (Note that since the server presented the job to the client, in preferred embodiments the client may infer that the expiration of the job's execution window had not occurred at the time the job was served up to the client.)

According to the present invention, if this client has work available but the earliest starting time for executing the job on that client has not yet been reached, then the job is not performed. Thus, when the test in Block 360 has a negative result, at Block 380 the client preferably notifies the server that the job is to be delayed (i.e. that the client is not yet going to process the job). Control then returns to Block 320 to see if the server has indicated that any more jobs are available for this client. If the test in Block 360 has a positive result, however, then the client performs the job (Block 370) and preferably reports its job completion status to the server (Block 390), after which control returns to Block 320.

In response to receiving a notification from a client that a job is to be delayed, as indicated in Block 380, the server preferably marks the job such that it will not be served up again to this client during this polling period.

Figure 4A:
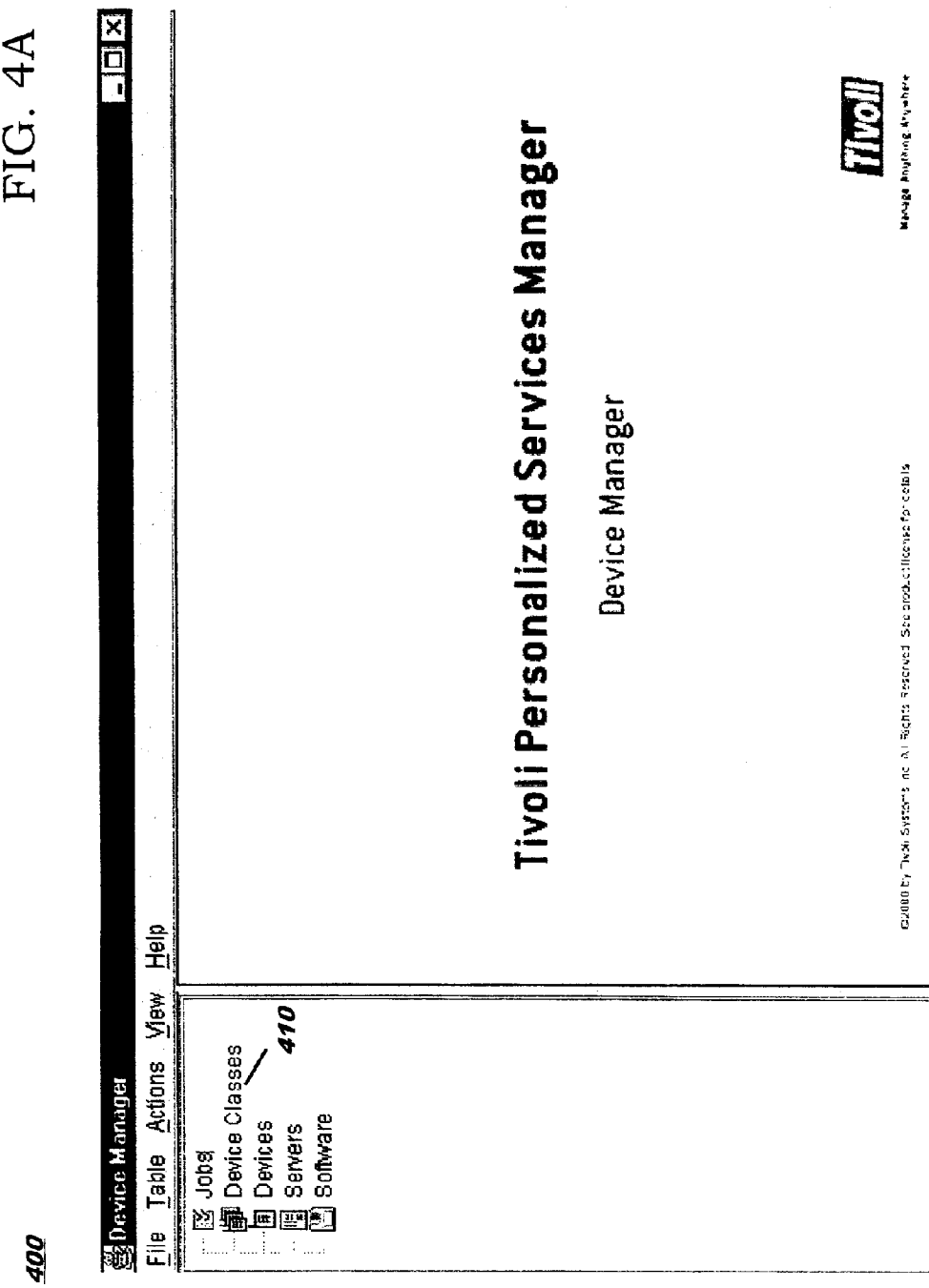
FIGS. 4A and 4B illustrate a sample graphical user interface display that may be presented to a systems administrator for use in scheduling jobs and setting one or more job configuration options or parameters which may be used by the present invention.
Figure 4B:
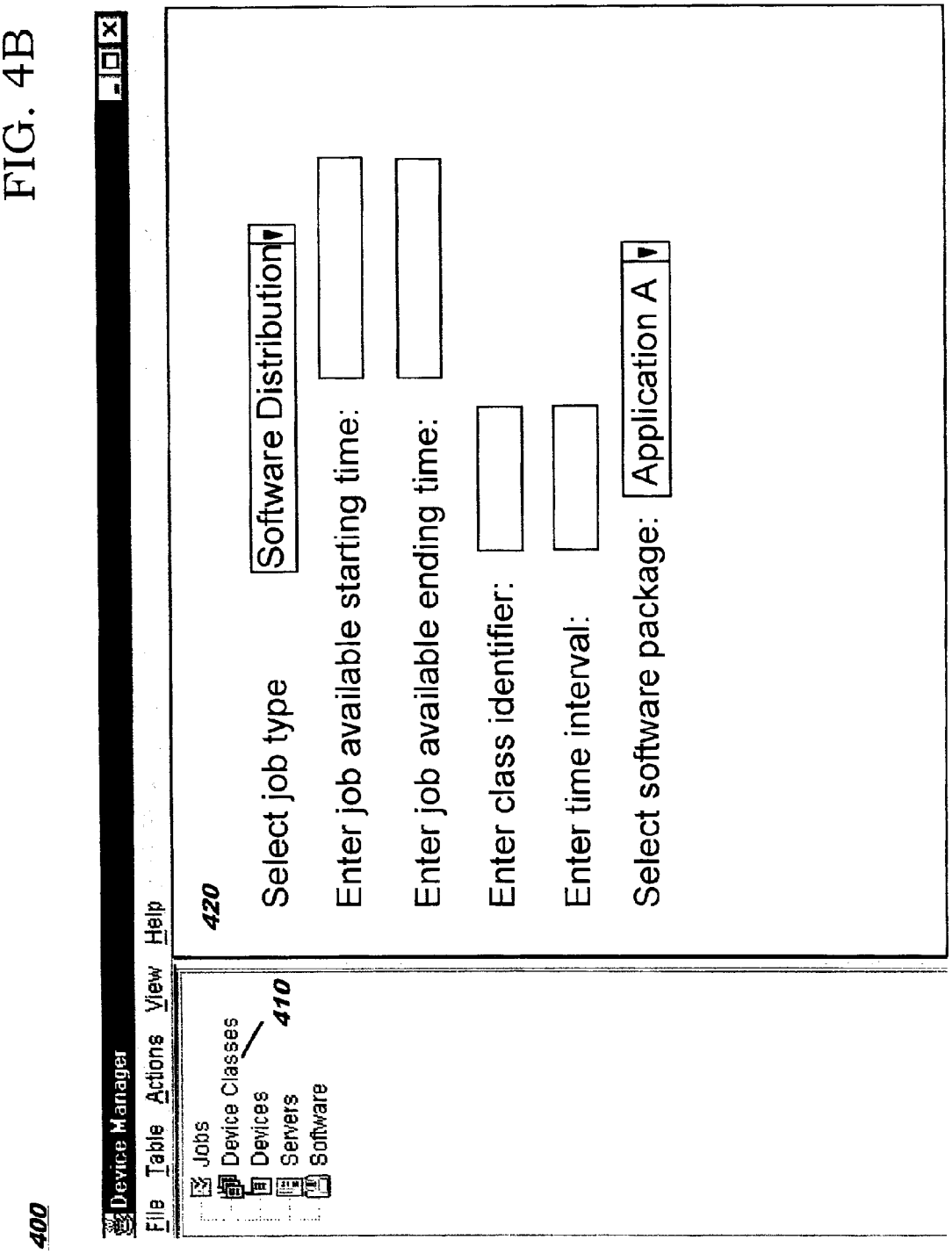

FIGS. 4A and 4B illustrate a sample graphical user interface ("GUI") display 400 that may be presented to a systems administrator for use in setting configuration options or parameters which may be used by the present invention. This sample GUI display 400 is adapted from the TPSM system administrator console. As shown in FIG. 4A, the systems administrator may elect to define attributes or properties of a device class 410, when a particular resource distribution job is to be available to members of that device class, characteristics of the job to be submitted, etc. FIG. 4B provides a sample panel 420 that may be used to prompt the administrator to enter the execution window for a particular job, as well as the load-balancing time interval that will be used in calculating the earliest starting time for executing the job on the requesting client, thereby configuring the distribution of jobs over time. The administrator may consider many factors in this configuration process, such as the importance of the job, the membership of the class (as well as the characteristics of the members), the expected duration of the job, the impact the job will have on other system components (for example, accounting for jobs that will have a larger impact on the application server versus on the load balancing host and/or on the network), characteristics of the devices in the class, properties of the network connection the devices will be using (e.g. whether the devices will use a low-bandwidth connection, or perhaps that they will use a relatively expensive wireless connection), the time of day at which the devices will typically connect and possibly the server load at that time, and so forth. (Such factors may be used in determining class membership as well as the load-balancing interval duration.) In addition to the information shown in panel 420, additional information pertaining to the job, such as an address from which it can be requested, key/value pairs or parameter values that may be needed when requesting the job, the job type, and so forth may be provided. (As will be obvious, the example shown in FIGS. 4A and 4B is merely one technique which may be used to obtain this information, and this example is provided for purposes of illustration and not of limitation.)

The scheduling technique of the present invention serves to distribute requests for resource distribution (or to schedule other types of jobs) over time, based on a configurable interval. Beneficial results may thereby be achieved in environments where the available server capacity is otherwise unable to satisfy peak demands, and enables serving more users and/or devices without requiring installation of additional servers. In environments where the client requests are particularly clustered in time, for example when many devices are powered up for the first time after some extended period of inactivity, the results of using the present invention may be especially pronounced by avoiding a large spike in the number of requests for resource distribution jobs that would otherwise attempt to run simultaneously. The disclosed techniques consider the disconnected nature of many client devices, the intermittent nature of job requests, and the complexity of job scheduling which necessitates a programmatic scheduling solution. Use of the disclosed techniques reduces the likelihood of system overload as well as the likelihood of cascading failures of jobs during heavy load conditions. (Note that the system components which may encounter less overloading through use of the present invention may include, but are not limited to, the application server(s), the device management server(s), elements of the back-end network, links to client devices, and so forth.)

The present invention will now be contrasted with several prior art techniques for scheduling jobs. First, it is conceivable that a systems administrator might define sliding execution windows for jobs, where a different execution window is separately defined for various devices or subclasses of devices (or for each individual device) that may request this job in order to spread out the processing load. This manual approach does not scale well for systems in which the number of devices may run into the thousands or millions. It also may not easily handle devices the management system is not aware of yet (such as a new device for an existing customer, devices from customers not yet enrolled in the device management system, and so forth), but which may become a member of a device class once it is known to the management system. (The technique of the present invention, on the other hand, is easily adaptable to dynamically-added devices, as can be seen by inspection of the logic in FIGS. 2 and 3.) A manual approach is also cumbersome and error-prone, and quickly becomes quite unwieldy as the number of jobs and the number of devices becomes large.

U.S. Pat. No. 4,497,978, which is titled "Method and apparatus for preventing overloading of the central controller of a telecommunication system", discloses a technique for preventing overload of a central controller by rapidly detecting an imminent overload. The number of tasks (which may be, for example, incoming telephone calls) being processed and the number of idle jobs which were performed are taken as a measure of the load. On the basis of the continuously actualized value of the maximum number of tasks which can be handled, the technique disclosed in this patent determines at each new task whether the maximum number of tasks for that period has been exceeded. If so, then tasks may be rejected. The present invention, on the other hand, does not reject jobs but instead dynamically adjusts the earliest available start time of jobs to avoid system overload.

U.S. Pat. No. 4,337,513, which is titled "Electronic type engine control method and apparatus", discloses a technique for allocating execution times for individual tasks within a system (an internal combustion engine) to prevent system overload, based upon a consideration of how the tasks influence the central processing unit in controlling the engine. More important tasks can be executed more frequently. No techniques are disclosed for scheduling a plurality of distribution tasks within an interval, as is done for scheduling the distribution of resources to multiple receivers according to the present invention.

An article titled "Scheduling an Overloaded Real-Time System", by Shyh In Hwang et al., printed in Conference Proceedings of the 1996 IEEE Fifteenth Annual International Phoenix Conference on Computers and Communications (Cat. No. 96CH35917), Scottsdale, Ariz., Mar. 27–29, 1996, discloses a technique where every task in a real-time system has an associated timing constraint. In order to schedule the tasks, the paper proposes assigning criticality and weight parameters to each job, and then scheduling all of the critical tasks first. After all of the critical tasks are accommodated in the scheduling algorithm, the non-critical tasks are included according to their weight. Non-critical tasks may get dropped if insufficient time is available. The technique of the present invention does not require assigning criticality or weight parameters, and does not assign execution times according to such parameters. Rather, the present invention may simply delay the start of a task or job in some cases (i.e. if the job has not yet reached its earliest starting time for a particular requesting client), and the starting time of a job is flexible depending on when the device connects to the device management system and whether the execution window has been reached. Due to the often-disconnected nature of the devices being managed in the system of the present invention, it is not feasible to use a technique wherein fixed execution times are statically computed.

"Method governing number of concurrently executing processes in thread based scheduler monitoring occurrences of certain events across system such as network utilization and disk input output performance", by R. H. Williams, discloses use of a scheduling governor to prevent system overloads. The number of concurrently-executing tasks is limited to a preset capacity. Additional tasks may execute, based upon their assigned priority, when an execution slot becomes available. The present invention, on the other hand, does not specify capacity limitations and does not require jobs to be scheduled based upon an assigned priority.

As will be appreciated by one of skill in the art, embodiments of the present invention may be provided as methods, systems, or computer program products. Accordingly, the present invention may take the form of an entirely hardware embodiment, an entirely software embodiment or an embodiment combining software and hardware aspects. Furthermore, the present invention may take the form of a computer program product which is embodied on one or more computer-usable storage media (including, but not limited to, disk storage, CD-ROM, optical storage, and so forth) having computer-usable program code embodied therein.

The present invention has been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, embedded processor or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart and/or block diagram block or blocks.

While preferred embodiments of the present invention have been described, additional variations and modifications in those embodiments may occur to those skilled in the art once they learn of the basic inventive concepts. Therefore, it is intended that the appended claims shall be construed to include preferred embodiments and all such variations and modifications as fall within the spirit and scope of the invention.

What is claimed is:

1. A method of improving resource distribution to network-connected devices, comprising steps of:
   determining whether a requester of a resource distribution job should receive the resource distribution job, further comprising steps of:
   determining a job-specific execution window applicable to this resource distribution job;
   determining a requester-specific execution window comprising an earliest time during the job-specific execution window when the job is available to this requester; and
   concluding that the requester should receive the job if the requester's request is processed during the requester-specific execution window, and that the requester should not receive the job otherwise; and
   distributing the requested resource distribution job to the requester if so.

2. The method according to claim 1, wherein class membership of a class of the requester is used in the step of determining the requester-specific execution window.

3. The method according to claim 2, wherein the class membership is based upon a device type of a device of the requester.

4. The method according to claim 2, wherein the class membership is based upon software installed on a device of the requester.

5. The method according to claim 2, wherein the class membership is based upon one or more characteristics of users who may request the resource distribution job.

6. The method according to claim 2, wherein the class membership is based upon one or more characteristics of a device from which the job was requested.

7. The method according to claim 2, wherein the class membership is based upon one or more properties of a network connection over which the job was requested.

8. The method according to claim 7, wherein the properties of the network connection include (1) a bandwidth of the network connection and (2) a cost of the network connection.

9. The method according to claim 2, wherein the class membership is based upon one or more characteristics of an environment in which the job was requested.

10. The method according to claim 1, further comprising the step of installing resources of the distributed resource distribution job on the requester.

11. The method according to claim 1, wherein class membership of a subclass of which the requester is a member is used in the step of determining the requester-specific execution window.

12. The method according to claim 1, wherein the step of determining a requester-specific execution window uses an ordinal number associated with a device of the requester.

13. The method according to claim 1, wherein the step of determining a requester-specific execution window uses a current time in microseconds of receiving the request for the resource distribution job.

14. The method according to claim 1, wherein the step of determining a requester-specific execution window uses a random number.

15. A method of improving scheduling of jobs for network-connected devices, comprising steps of:
   determining a job-specific execution window applicable to a job requested by a job requester;

determining a requester-specific execution window comprising an earliest time during the job-specific execution window when the job is available to this requester; and distributing the job to the requester only if the requester-specific execution window has been reached.

16. The method according to claim 15, wherein the job comprises fetching inventory information related to the requester's computing device from that device.

17. A method of improving resource distribution to network-connected devices, comprising steps of:

determining whether a resource distribution job is available for a particular device;

determining a job-specific execution window over which the available job may be performed;

determining an earliest time in the execution window when the available job may be executed for the particular device; and allowing the available job to be performed for or by the particular device only if the earliest time has been reached.

18. A system for improving resource distribution to network-connected devices, comprising:

means for determining whether a requester of a resource distribution job should receive the resource distribution job, further comprising:

means for determining a job-specific execution window applicable to this resource distribution job;

means for determining a requester-specific execution window comprising an earliest time during the job-specific execution window when the job is available to this requester; and means for concluding that the requester should receive the job if the requester's request is processed during the requester-specific execution window, and that the requester should not receive the job otherwise; and means for distributing the requested resource distribution job to the requester if so.

19. A computer program product for improving resource distribution to network-connected devices, the computer program product embodied on one or more computer-usable media and comprising:

computer readable program code means for determining whether a requester of a resource distribution job should receive the resource distribution job, further comprising:

computer readable program code means for determining a job-specific execution window applicable to this resource distribution job;

computer readable program code means for determining a requester-specific execution window comprising an earliest time when the job is available to this requester; and computer readable program code means for concluding that the requester should receive the job if the requester's request is processed during requester-specific execution window, and that the requester should not receive the job otherwise; and computer readable program code means for distributing the requested resource distribution job to the requester if so.

\* \* \* \* \*